United States Patent [19]

Tackett

[11] Patent Number: 5,321,558
[45] Date of Patent: Jun. 14, 1994

[54] METHOD OF STORING DATA ON A MAGNETIC TAPE

[75] Inventor: Raymond P. Tackett, Philadelphia, Pa.

[73] Assignee: Professional Consulting and Computing Services, Inc., Maynard, Mass.

[21] Appl. No.: 581,528

[22] Filed: Sep. 12, 1990

[51] Int. Cl.⁵ .............................................. G11B 5/09
[52] U.S. Cl. ...................................... 360/39; 360/48; 360/50
[58] Field of Search ....................... 360/50, 18, 22, 24, 360/33.1, 48, 39; 364/239.6, 245.6, 246; 395/575

[56] References Cited

U.S. PATENT DOCUMENTS

4,891,784  1/1990  Kato et al. ........................... 364/900
5,053,945 10/1991  Whisler ............................. 364/239.6
5,210,851  5/1993  Kato et al. ........................... 395/425

Primary Examiner—David Mis
Attorney, Agent, or Firm—Kriegsman & Kriegsman

[57] ABSTRACT

A method for storing data onto a magnetic tape from one or more sources includes providing a first temporary storage area for temporarily holding data and a second temporary storage area for temporarily holding housekeeping information. The first temporary storage area contains a predetermined number of data holding areas of fixed size. A quantity of data to be stored is read into the first data holding area of the first temporary storage area. Housekeeping information identifying the data held in the first data area and its location therein is formulated and written into the second temporary storage area. The process is repeated until the first storage area is full or there is no more data to store. The contents of the first and second temporary storage areas are then written onto the tape as a single unit. The procedure is repeated as necessary until the tape is full or all of the data to be stored has been written onto the tape.

8 Claims, 6 Drawing Sheets

METHOD OF STORING DATA ON A MAGNETIC TAPE

BACKGROUND OF THE INVENTION

The present invention relates generally to storing data and more particularly to a new and improved method for storing data onto magnetic tapes. The invention is intended to be used primarily with tapes being made for backup purposes, but, as will hereinafter become apparent, is not necessarily limited to tapes being prepared for that purpose. Also, although the invention is intended to be used in storing onto tapes data which is obtained from disks, it is not exclusively limited to data obtained from that type of source.

The present invention enables more data to be stored on a magnetic tape than previously possible, and in many cases enables a particular piece of data to be located faster than had been achievable in the past.

As will also hereinafter become apparent, the present invention is not limited to use with any one particular type of tape drive.

The conventional way to store data from disks onto a tape for backup purposes is to write the individual records from one file onto the tape, one record at a time. The individual records making up a file, if a file has more than one record, are separated from one another either by blank spaces commonly referred to as inter-record gaps or by tape or file marks, the type of separation being used depending on the nature of the programmatic method involved. After one file is written onto the tape, another file is written onto it in the same manner, and so forth. Successive files are usually separated by a tape mark with the tape mark being between the pair of inter-record gaps.

The basic problem with this arrangement for storing data onto a tape is that a considerable portion of the tape is not actually utilized for the storage of data but rather is taken up by the file gaps, the file marks and the inter record gaps. In some types of tapes, such as the helical scan, the area on the tape not used for storing data can sometimes be even larger than the area that is actually used for storing data, when dealing with large numbers of small files.

Retrieving a particular file on a tape formatted in the conventional way as described above also has disadvantages. First, it is necessary to prepare a list having the name and file number of each file on the tape. The list is usually put on the tape itself as an additional file at the end of a tape, or on a disk as a file or on a separate paper printout. Once the list has been prepared it is relatively simple and quick to locate a particular file; however, preparing the listing itself is very time consuming project and in many instances is not made at the time that data is initially put on the tape, but rather at the time the tape is being used to restore some information.

Accordingly, it is an object of this invention to provide a new and improved method for storing data on a magnetic tape.

It is another object of this invention to provide a method for storing data on a magnetic tape which does not involve the use of the usual number of inter-record gaps or file marks.

It is a further object of this invention to provide a method for storing data on a magnetic tape which does not require the creation of a separate listing to identify all of the data on the tape.

It is still a further object of this invention to provide a method of storing data onto a magnetic tape from one or more magnetic disks.

It is yet still a further object of this invention to provide a method of storing data onto a magnetic tape magnetic for use as a backup tape.

It is another object of this invention to provide a method of storing data onto a magnetic tape wherein the data is not formatted in terms of files and records.

It is still another object of this invention to provide a method of storing data onto a magnetic tape to provide a new and improved method for restoring all or a portion of the data stored on a magnetic tape in the manner as noted hereinabove.

It is yet still another object of this invention to provide a Multiple Input Source Organization (MISO) tape format for holding data from multiple input sources, simultaneously interspersed on the tape.

SUMMARY OF THE INVENTION

A method of storing data onto a magnetic tape according to the teachings of the present invention comprises providing a first temporary storage area for holding data and a second temporary storage area for holding housekeeping information, reading into the first temporary storage area data to be stored on the tape, formulating housekeeping information identifying the data held in the first temporary storage area and its location within the first temporary storage area, writing said housekeeping information into the second temporary storage area, repeating the reading, formulating and writing steps as above until the first temporary storage area is full or there is no more data to store, writing the contents of the first and second temporary storage areas onto the magnetic tape as a single tape block, and then repeating the process described above as necessary until the tape is full or all of the data to be stored has been written onto the tape.

Data so stored may be restored onto a medium by essentially reversing the method as described above.

Various features and advantages will appear from the description to follow. In the description, reference is made to the accompanying drawing which forms a part thereof, and in which are shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is therefore, not to be taken in a limiting sense, and the scope of the present invention is best defined by the appended claims.

BRIEF DESCRIPTION OF THE DRAWINGS

In the drawings wherein like reference numerals represent like parts.

DETAILED DESCRIPTION OF PREFERRED EMBODIMENTS

The present invention is directed to a technique for storing data onto a magnetic tape wherein the data is stored onto the tape in increments of predetermined size referred to as tape blocks, with each block including a quantity of data to be stored and, in addition, housekeeping information identifying the data that is contained within that tape block. The invention is also directed to a method of retrieving data stored on a magnetic tape in this way.

Figure 1:
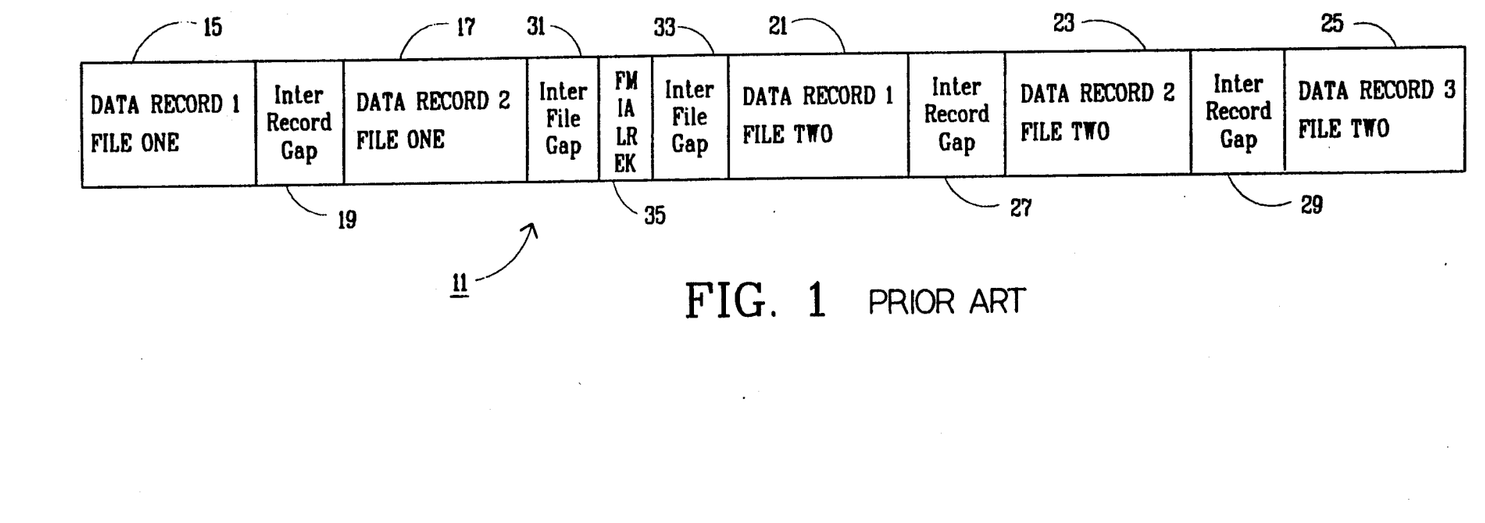
FIG. 1 is a simplified representation of a prior art tape format.

Referring now to the drawings, there is shown in FIG. 1 a simplified diagram of a prior art tape format for storing data on magnetic tape, the tape format being represented by reference numeral 11.

As can be seen, the formatting involves storing all the data records from one file onto the tape, one after the other, then storing all of the data records from another file onto the tape, one after the other and so forth. For illustrative purposes, two files are shown, the first file having two records identified as data record 1 and data record 2 and the second file having three data records identified as data record 1, data record 2 and data record 3.

As shown, data record 1 of file 1 is in area 15, and data record 2 of file 1 is in area 17. Area 15 is separated from area 17 by an inter record gap 19. Data record 1 of file 2 is in area 21, data record 2 of file 2 is in area 23 and data record 3 of file 2 is in area 25. Area 21 is separated from area 23 by an inter record gap 27, and area 23 is separated from area 25 by an inter record gap 29. Area 17 is separated from area 21 by two inter file gaps 31 and 33 and a file mark 35, with file mark 35 being sandwiched between the two inter-file gaps 31 and 33. The areas holding records vary in size, the particular size depending on the size of the record.

Thus, successive data records in the same file area separated from each other by inter-record gaps and successive files are separated from each other by two inter-file gaps and one file mark.

As can be appreciated, if there are a number of files on a tape the space taken up by the inter-file gaps and the file mark can be substantial.

The present invention significantly reduces the need for inter-file gaps, file marks and inter-record gaps.

Figure 2:
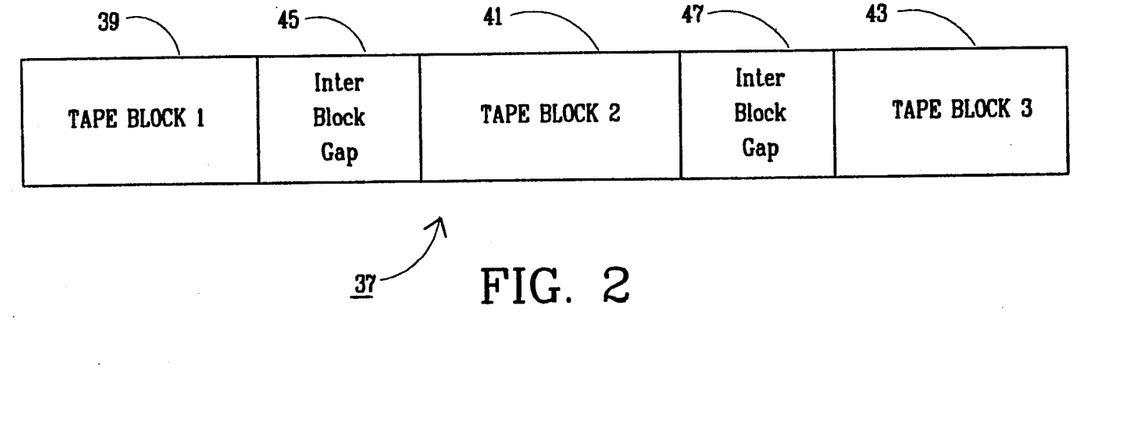
FIG. 2 is a simplified representation of a tape format according to this invention.

Referring now to FIG. 2, there is shown a tape format according to this invention, the format being identified by reference numeral 37 and being referred to herein as the MISO tape format.

MISO format 37 comprises a series of tape blocks. For illustrative purposes, only three tape blocks are shown, the type blocks being identified, from left to right, by reference numerals 39, 41 and 43. Tape blocks 39, 41 and 43 are shown as being separated from one another by inter-block gaps 45 and 47; however, the inter-block gaps are not essential but, rather, merely dependent on the particular tape drive employed with the tape.

Figure 3:
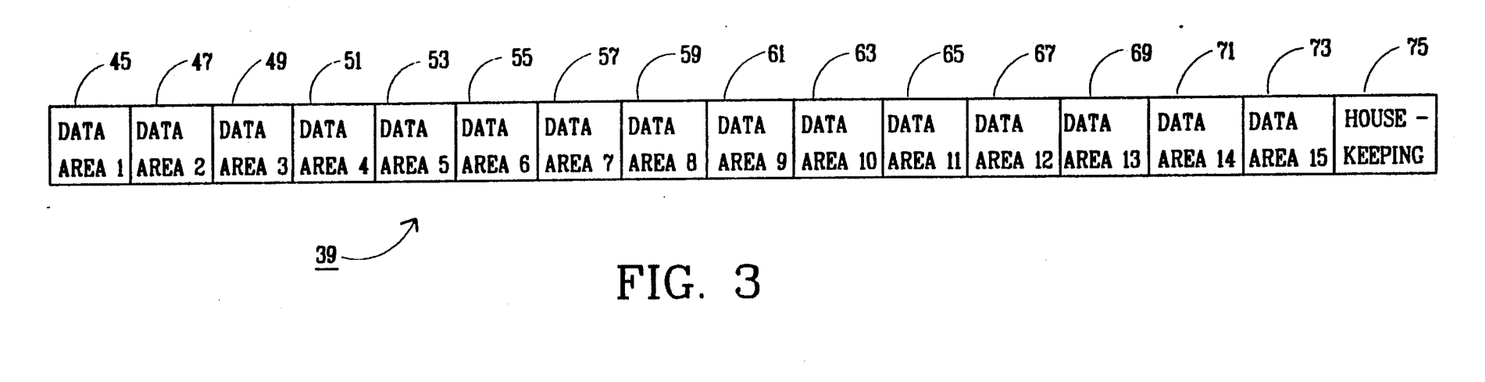
FIG. 3 is a simplified representation showing the details of one of the tape blocks shown in FIG. 2.

Referring now to FIG. 3, there are shown the details of tape block 39.

As can be seen, tape block 39 is divided into sixteen areas. The first fifteen areas, identified by reference numerals 45 through 73 are data areas which are used for holding data while the sixteenth data area, identified by reference numeral 75 is a housekeeping area which is used for holding information as to the contents of the other fifteen areas. Data areas 1 through 15, i.e. reference numerals 45 through 73, are each 2K bytes in size. The sixteenth area, namely, housekeeping area 75 is variable in size depending on how much information is stored therein; with a probable maximum size of no more than 2K bytes, and more probably no more than about 1100 bytes to accommodate the first fifteen blocks. Tape block 39 is intended to hold data (and associated housekeeping information) from no more than one volume. Each data area in tape block 39 is intended to hold data from no more than one file. Any part of a data area not completely filled with data is filled with non-usable binary information. If the tape block is the last block in a volume, then the number of data areas with fifteen, or less than fifteen if a lesser amount is all that is needed.

It should be noted that the number of data areas in a tape block as shown in FIG. 3 is by way of example only as being fifteen, and that it could be made more or less than fifteen, as desired. Also, the size of the data areas, namely 2K bytes, is also by way of example only and could be made more or less than that amount. 2K byte areas are desirable since a disk block, the conventional size of a sector on a disk, is 2K bytes. Thus, each tape area will hold one disk block. Also, the location of the housekeeping area at the end of the tape block, as opposed to at the beginning or middle of the tape block, is desirable but not essential, as can be appreciated.

Tape blocks 41 and 43 are identical in size as data block 39, with the same limitations as noted above.

The housekeeping area can contain either of the two types of housekeeping records. The first housekeeping record for each file placed on tape is a type one housekeeping record, which is long enough to have all the attributes of the file (type, dates, protection class, etc.). It also contains a hash code, or ID tag, for subsequent housekeeping. In the event the size of the file exceeds 2K bytes, second and subsequent housekeeping records will be created as type two records, which contain only the hash code and the relative data area of the file from zero from the given data area.

Figure 4:
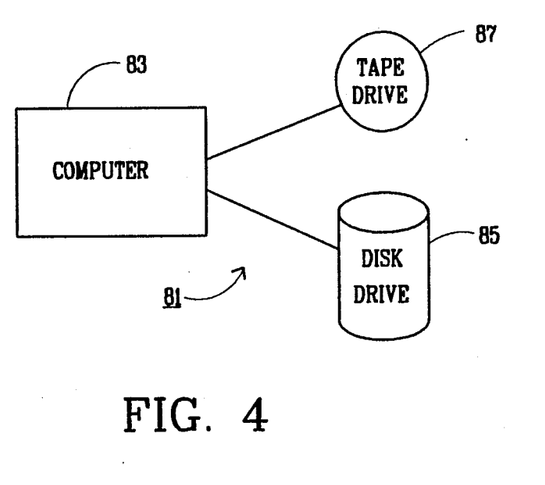
FIG. 4 is a block diagram of an apparatus for practicing the method of this invention.

The apparatus 81 for practicing the method of this invention is shown in FIG. 4 and includes a computer 83, a drive 85 for the media holding the source data, and a drive 87 for the tape on which the data is to be stored.

Figure 5A:
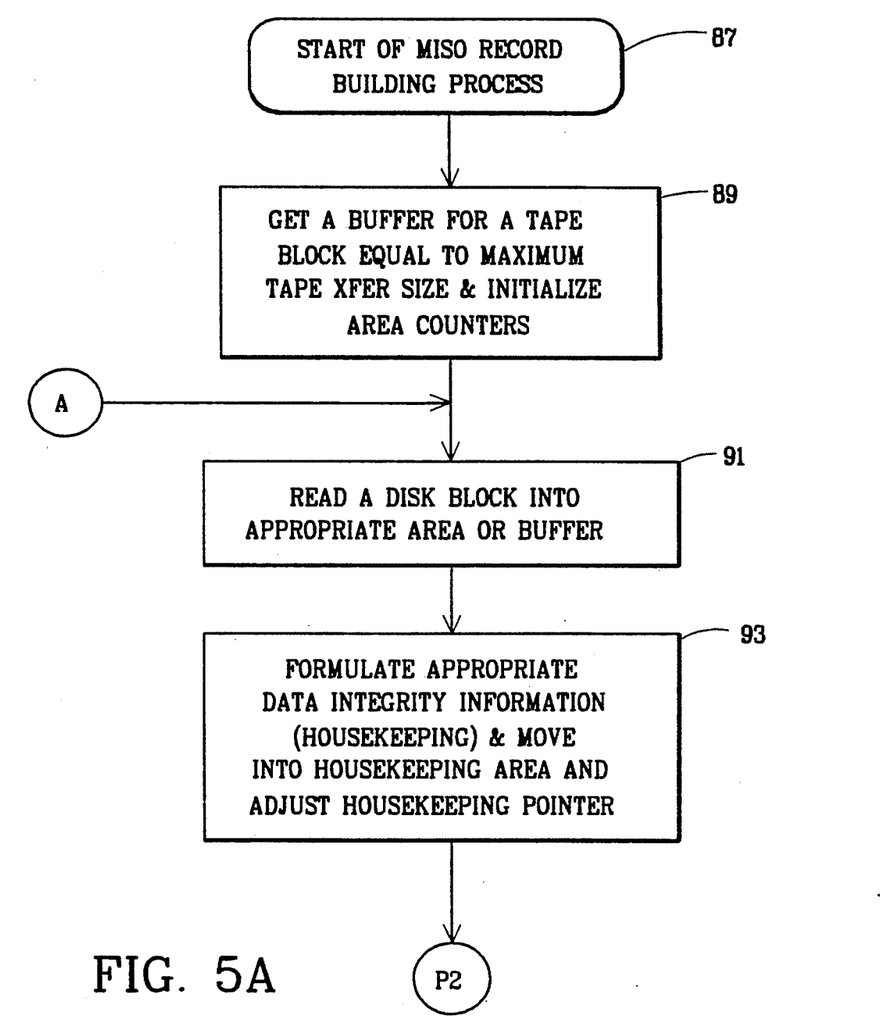
FIGS. 5A and 5B comprise is a flow chart showing how one of the tape blocks shown in FIG. 1 is built and then written onto a tape.
Figure 5B:
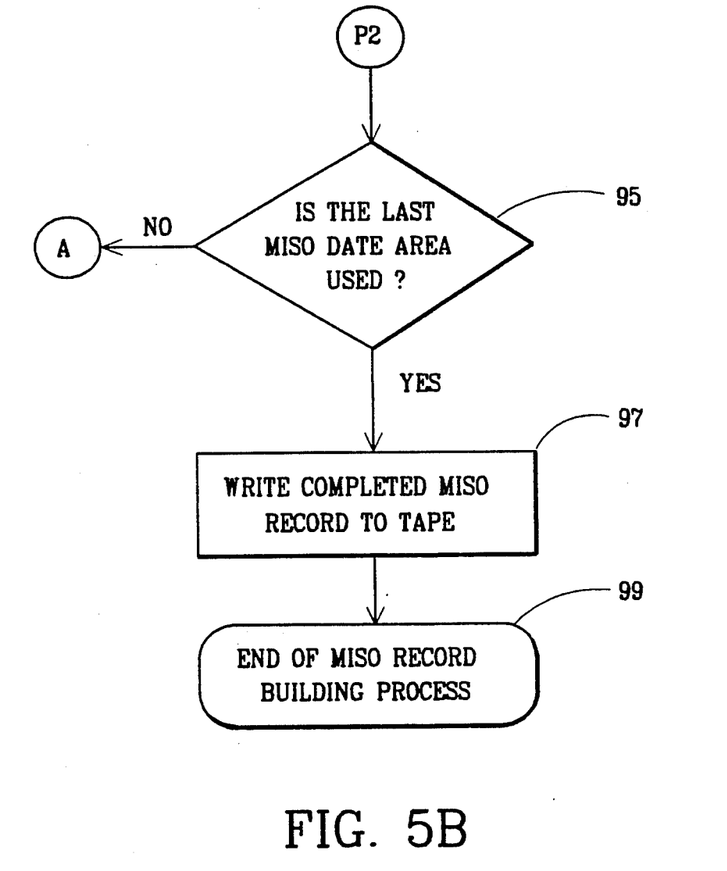

Referring now to FIG. 5, there is shown a flow chart illustrating how a tape block is created on a tape from data stored on a disk, according to this invention.

The proces starts at step 87.

Step 89 calls for providing a buffer for a tape block equal to the maximum tape transfer size and initializing a pair of area counters associated with the buffer. The buffer includes one area which is to be used for storing data and another area which is to be used for storing housekeeping information.

Next, according to step 91, a block of data is read from the disk into the beginning of the area used for storing data.

Next, according to step 93, housekeeping information identifying the data that has just been read into the area used for storing data is generated and written into the beginning of the housekeeping area. The pointer associated with the housekeeping area in the buffer is then moved to its next respective available locations.

The procedure of reading a disk block into the data area and generating housekeeping information and writing the housekeeping information is repeated until either the entire data storage area in the buffer is filled or there is no more data to store from the particular volume being stored. This is shown as step 95.

Once the entire data storage area in the buffer is filled with data and the associated housekeeping information entered, the entire contents of the buffer, i.e. data and housekeeping information, is moved onto the tape in series as per step 97.

The procedure is then repeated as necessary until the tape is full or all of the data is stored as shown in step 99.

Data may be restored from a tape which has been stored thereon in the manner described above, by first locating the particular tape block containing the desired data, and then reversing the procedure set forth in the flow chart in FIG. 5. If the data is in more than one tape block, the procedure is repeated as necessary.

Figure 6A:
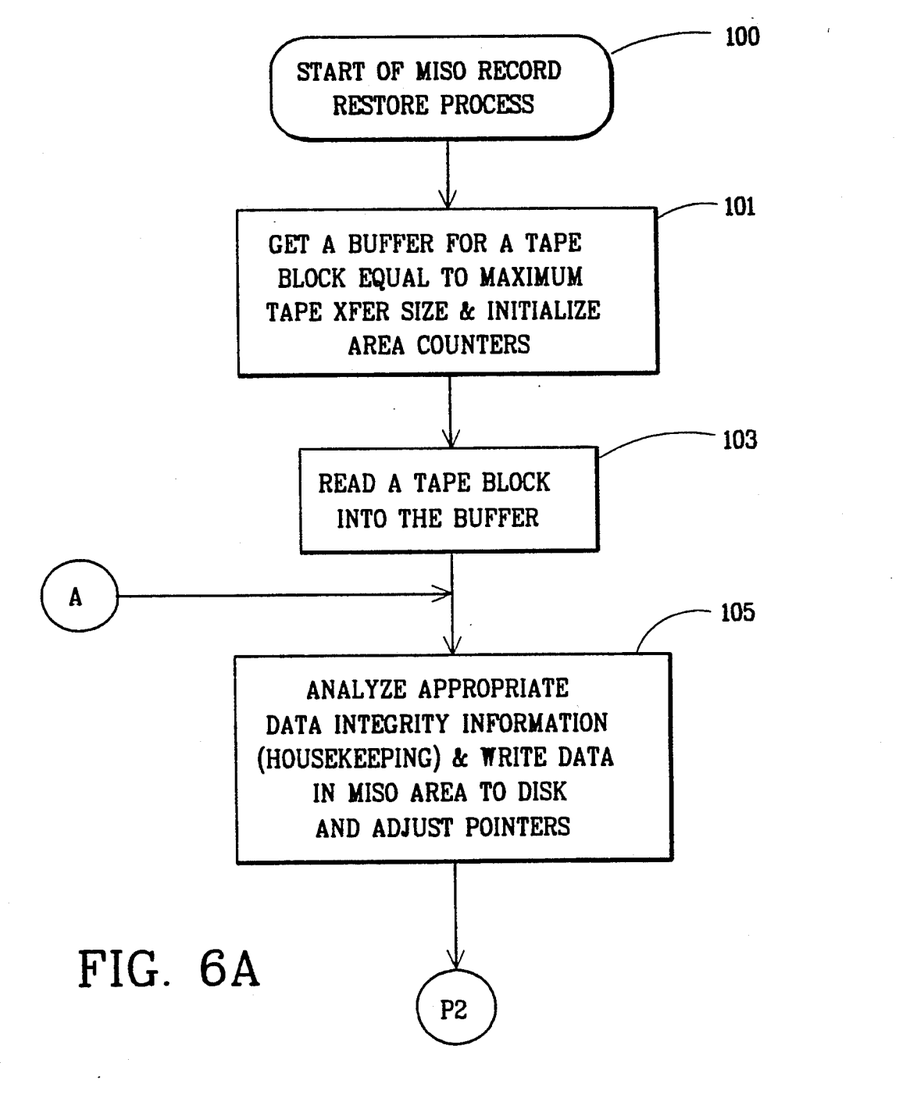
FIGS. 6A and 6B comprise is a flow chart showing how a tape block stored on a magnetic tape according to this invention may be restored onto a disc.
Figure 6B:
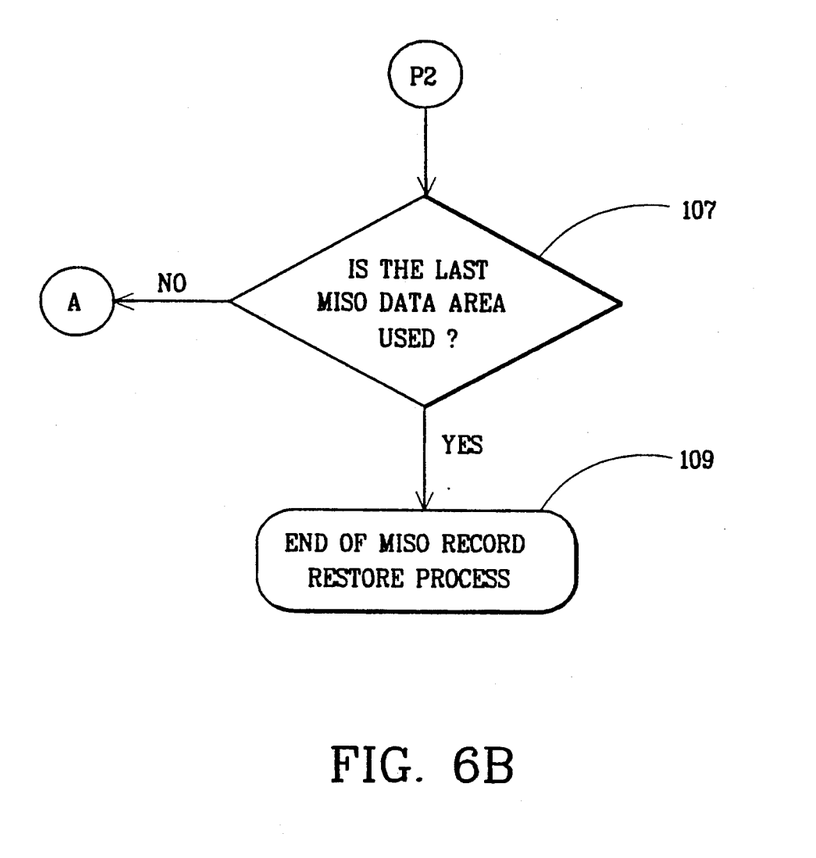

A flow chart illustrating the steps in restoring a tape block onto a disc is shown in FIG. 6. The steps include step 100 which is the start of the process, step 101 which involves providing a buffer for a tape block equal to the maximum tape transfer size and initialize a pair of area counters associated therewith, step 103 which involves reading a tape block into the buffer, step 105 which involves reading the housekeeping information, and writing the data then steps 107 and 109 which involve writing the data onto the disc, a disc block (i.e. a data area) at a time.

The embodiments of the present invention is intended to be merely exemplary and those skilled in the art shall be able to make numerous variations and modifications to it without departing from the spirit of the present invention. All such variations and modifications are intended to be without the scope of the present invention as defined in the appended claims.

What is claimed is:

1. A method of storing data from a source onto a magnetic tape comprising the steps of:
   a. providing a first temporary storage area for temporarily holding data and a second temporary storage area for temporarily holding housekeeping information, the first temporary storage area having a predetermined number of data holding areas of fixed size,
   b. reading data to be stored from the source into a first data holding area in the first temporary storage area,
   c. formulating said housekeeping information regarding the contents of the data held in the first data holding area of the first temporary storage area therein and the location of the first data holding area in the first temporary storage area,
   d. writing said housekeeping information so formulated into said second temporary storage area,
   e. repeating steps (a) through (d) until the first temporary storage area is full or all of the data to be stored has been written therein,
   f. writing the contents of the first and second temporary storage areas into the tape, as a single unit, and then
   g. repeating steps (a) through (f), as necessary, until the magnetic tape is full or all of the data to be stored has been written onto the tape.

2. The method of claim 1, wherein the predetermined number of data holding areas in the first temporary storage area is fifteen.

3. The method of claim 2, wherein each area has data from no more than one file.

4. The method of claim 3, wherein data from no more than one volume is placed in the first temporary storage area at one time.

5. In a magnetic tape having data stored therein, the improvement wherein the data is stored in the form of a plurality of tape blocks, said tape blocks being arranged in series, each tape block comprising at least one and no more than a predetermined number of data holding areas and one area for holding housekeeping information identifying the data stored in each data holding area and the location of the data holding area in the tape block, the housekeeping information comprising either a type one housekeeping record having all the attributes of the file including type dates, protection class and hash code or a type two housekeeping record having only the hash code and the relative data area of the file from zero from the given data area.

6. The magnetic tape of claim 5, wherein the area for holding housekeeping information is variable in size.

7. A method of storing data from a source onto a magnetic tape comprising the steps of:
   a. providing a first temporary storage area for temporarily holding data and a second temporary storage area for temporarily holding housekeeping information, the first temporary storage area having fifteen data holding areas, each 2K bytes size,
   b. reading data to be stored from the source into a first data holding area in the first temporary storage area,
   c. formulating housekeeping information regarding the contents of the data held in the first data holding area of the first temporary storage area therein, and the location of the first data holding area in the first temporary storage area,
   d. writing said housekeeping information so formulated into said second temporary storage area,
   e. repeating steps (a) through (d) until the first temporary storage area is full or all of the data to be stored has been written therein,
   f. writing the contents of the first and second temporary storage areas onto the tape, as a single unit, and then
   g. repeating steps (a) through (f), as necessary, until the magnetic tape is full or all of the data to be stored has been written onto the tape.

8. A method of storing data from a source onto a magnetic tape comprising the steps of:
   a. providing a first temporary storage area for temporarily holding data and a second temporary storage area for temporarily holding housekeeping information, the first temporary storage area having fifteen data holding areas, each 2K bytes size and said second temporary storage and is 2K bytes in size,
   b. reading data to be stored from the source from no more than one file into a first data holding area in the first temporary storage area,
   c. formulating housekeeping information regarding the contents the data held in the first data holding area of the first temporary storage area therein and the location of the first data holding area in the first temporary storage area, d. writing said housekeeping information so formulated into said second temporary storage area, e. repeating steps (a) through (d) until the first temporary storage area is full or all of the data to be stored has been written therein, said first temporary storage area having data from no more than one volume, f. writing the contents of the first and second temporary storage areas onto the tape, as a single unit, and then g. repeating steps (a) althrough (f), as necessary, until the magnetic tape is full or all of the data to be stored has been written onto the tape.

* * * * *